Sept. 10, 1940.  A. H. McKEAG  2,214,643
LUMINESCENT MATERIAL
Filed June 23, 1939
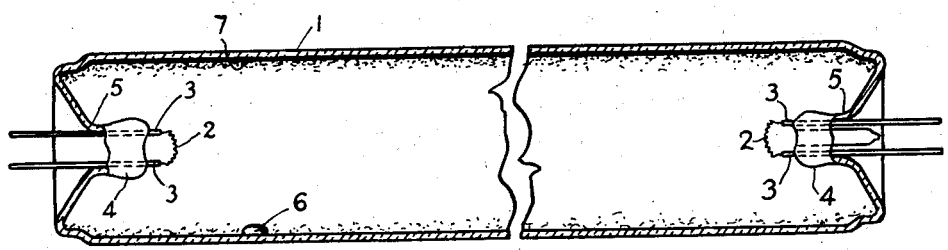
Inventor:
Alfred Hamilton McKeag
by Harry E. Dunham
His Attorney Patented Sept. 10, 1940

2,214,643

UNITED STATES PATENT OFFICE 2,214,643

LUMINESCENT MATERIAL

Alfred Hamilton McKeag, Wembley, England, assignor to General Electric Company, a corporation of New York Application June 23, 1939, Serial No. 280,865
In Great Britain June 13, 1938

1 Claim. (Cl. 250—81)

This invention relates to luminescent materials, to the manufacture of such materials, and to combinations of them with means for exciting them to luminescence.

In British Patent Specification No. 495,706 there is described a new luminescent material which contains all of the elements cadmium and manganese and chlorine and phosphorus and oxygen, and is prepared by a process which produces in the finished product a certain crystal structure, and is such that the finished product will emit, under excitation by the mercury line of wavelength 2536 A. U. (which is now more usually said to be 2537 A. U.), warm luminescent light, that is to say, light whose colour departs from white in the direction of yellow or red and not in the direction of green or blue. In the said specification it is explained why the material cannot be identified by the usual matrix-activator description. This material will be referred to hereinafter as a cadmium chlorophosphate, or simply as a chlorophosphate.

I have now found another luminescent material of somewhat similar nature. It is prepared from materials containing cadmium and manganese and sodium and fluorine and phosphorus and oxygen. The luminescent light excited by radiation of wave-length 2537 A. U. is warm. The lattice structure of the material appears to be much more complex than that of the said chlorophosphate, and as yet can be defined only by a list of X-ray spacings. It has not been possible so far to relate these spacings to a crystal lattice, as was done for the chlorophosphate. Accordingly, as those skilled in the art will understand, it is not possible to be sure that all the spacings that have been observed are characteristic of the luminescent material itself and that some of them are not characteristic of inert material produced with the luminescent material in the course of its manufacture. Accordingly the term "substantially as set forth" hereinafter is to be interpreted so as to permit the elimination from Table I of those spacings that may be shown later to belong to material that plays no part in the luminescence.

According to the invention a luminescent material contains all of the elements cadmium and manganese and sodium and fluorine and phosphorus and oxygen, and is prepared by a process which produces in the finished product a crystal structure giving rise to X-ray spacings substantially as set forth in Table I below, and which is such that the finished product will emit under excitation by radiation of wave length 2537 A. U.

luminescent light whose colour is hereinbefore defined as warm.

In Table I the symbols in columns (a) and (b) have the same significance as in columns (1) and (2) of Table I on page 6 of the said Specification No. 495,706. That is, the quantity of $d/n$ listed in column (a) is the spacing in Angstrom units between the atomic planes generating the observed lines on the assumption that all reflections are of the first order, and column (b) denotes the intensities of the lines estimated visually.

Table I

| (a) $d/n$ | (b) Intensity | (a) $d/n$ | (b) Intensity |
|---|---|---|---|
| 8.64 | 1 | 1.822 | 4 |
| 6.30 | 1 | 1.809 | 2 |
| 5.74 | 2 | 1.770 | 1 |
| 4.07 | 1 | 1.747 | ½ |
| 3.778 | 3 | 1.725 | 4 |
| 3.728 | 3 | 1.686 | 2 |
| 3.346 | 5 | 1.625 | 1 |
| 3.243 | 3 | 1.586 | 3 |
| 3.090 | 8 | 1.557 | 3 |
| 2.925 | 5 | 1.541 | 1 |
| 2.885 | 6 | 1.533 | 1 |
| 2.826 | 5 | 1.507 | 1 |
| 2.754 | 2 | 1.486 | 1 |
| 2.601 | 4 | 1.470 | ½ |
| 2.546 | 5 | 1.452 | 2 |
| 2.459 | 5 | 1.430 | 1 |
| 2.309 | 1 | 1.421 | ½ |
| 2.229 | 2 | 1.385 | 2 |
| 2.192 | ½ | 1.361 | 2 |
| 2.155 | 2 | 1.344 | ½ |
| 2.040 | 1 | 1.329 | 2 |
| 1.967 | 3 | 1.312 | ½ |
| 1.906 | 1 | 1.299 | ½ |
| 1.872 | 5 | 1.288 | 1 |
| 1.851 | 2 | 1.231 | 2 |

Material according to the invention may be prepared by heating suitably together a suitable mixture containing all the said six elements. One method of preparing it will now be described by way of example, and one form of electric discharge lamp with which it may be used will be described by way of example with reference to the accompanying drawing, which is a side view, partly in section, of the lamp. No reason is known why any other method of preparation should be used.

478 gm. of cadmium sulphate (AnalaR grade) is dissolved in 1.5 litres of distilled water (AnalaR is a registered trade-mark meaning "analytical reagent"). 160 gm. of diammonium hydrogen phosphate (AnalaR grade) is dissolved in 1 litre of distilled water. The two solutions are heated to boiling. 10 ml. of the second solution is added to the first, and the precipitate produced is filtered off and discarded. The remainder of the second solution is added to the first and the precipitate (some form of cadmium phosphate) is filtered off and washed six times with hot distilled water. It is dried at 180° C. in air; it will be called precipitate A.

500 gm. of manganese chloride (AnalaR grade) is dissolved in 2 litres of boiling distilled water. 220 gm. of diammonium hydrogen phosphate (AnalaR grade) is dissolved in 2 litres of boiling distilled water. The two solutions are mixed; the precipitate (some form of manganese phosphate) formed is filtered off and, after washing six times with hot distilled water, is dried at 180° C. in air. It will be called precipitate B.

The following mixture is prepared:

|  | Grams |
|---|---|
| Precipitate A | 100 |
| Precipitate B | 10 |
| Sodium fluoride, of the kind supplied by British Drug Houses Ltd. corresponding to the U. S. P. grade | 20 |

The mixture is heated to between 850° C. and 875° C. in a tubular silica boat with the open end, which projects from the furnace, closed with a glass wool plug. Sintering takes place rapidly between these temperatures; when it is complete the mixture is withdrawn. Any coloured material is separated; the remaining white material is reground and heated at 800° C. for ½ hr. The coloured part may be reheated several times at 800° C. with regrinding between heatings, until it becomes white.

The white powder is washed with hot distilled water and dried at 180° C. It luminesces red under excitation by either of the mercury lines 2537 or 3650 A. U., but much more powerfully under 2537.

Like the chlorophosphate referred to hereinbefore, material according to the invention may be used in cathode-ray tubes, but its greatest utility is likely to be inside low-pressure mercury discharge lamps, and outside high-pressure mercury discharge lamps, especially with quartz envelopes. (The term "mercury" does not exclude the presence, in addition to mercury, of other substances which may contribute appreciably to the light from the discharge). Like most luminescent materials, material according to the invention may be mixed in known manner with other luminescent materials, and in particular those giving under excitation by the same agency light of different colour, or with inert material.

In the accompanying drawing the lamp shown is of the low-pressure mercury discharge type and comprises a tubular glass envelope 1 having a pair of electrodes 2 at the ends thereof. Each of said electrodes 2 shown is a thermionic cathode consisting of a coiled filament of refractory wire, preferably tungsten, having a coating of a suitable electron-emissive material, such as barium oxide, therein. However, other types of electrodes may be used, such as the well known "cold" cathodes. Each electrode is connected to a pair of leading-in wires 3, 3 having portions sealed into the seal portion 4 of an inwardly extending stem 5 on the envelope 1. The two leads 3, 3 at each end of the envelope are connected to the proper contact terminals of a suitable base (not shown) secured to each end of the envelope 1. The envelope 1 has a starting gas therein, preferably argon, at a pressure of approximately 4 mm. of mercury, and a small quantity of mercury 6.

The inner surface of the envelope 1 has applied thereto a coating 7 of the luminescent material in accordance with the invention; this coating may be applied to the surface in any suitable manner.

Having thus described my invention, what I claim as new and desire to secure by Letters Patent is:

A luminescent material containing cadmium, manganese, sodium, fluorine, phosphorus and oxygen arranged in a crystal structure characterized by the following X-ray spacings:

| $d/n$ | Intensity | $d/n$ | Intensity |
|---|---|---|---|
| 8.64 | 1 | 1.822 | 4 |
| 6.30 | 1 | 1.809 | 2 |
| 5.74 | 2 | 1.770 | 1 |
| 4.07 | 1 | 1.747 | ½ |
| 3.778 | 3 | 1.725 | 4 |
| 3.728 | 3 | 1.686 | 2 |
| 3.346 | 5 | 1.625 | 1 |
| 3.243 | 3 | 1.586 | 3 |
| 3.090 | 8 | 1.557 | 3 |
| 2.925 | 5 | 1.541 | 1 |
| 2.885 | 6 | 1.533 | 1 |
| 2.826 | 5 | 1.507 | 1 |
| 2.754 | 2 | 1.486 | 1 |
| 2.601 | 4 | 1.470 | ½ |
| 2.546 | 5 | 1.452 | 2 |
| 2.459 | 5 | 1.430 | 1 |
| 2.309 | 1 | 1.421 | ½ |
| 2.229 | 2 | 1.385 | 2 |
| 2.192 | ½ | 1.361 | 2 |
| 2.155 | 2 | 1.344 | ½ |
| 2.040 | 1 | 1.329 | 2 |
| 1.967 | 3 | 1.312 | ½ |
| 1.906 | 1 | 1.299 | ½ |
| 1.872 | 5 | 1.288 | 1 |
| 1.851 | 2 | 1.231 | 2 |

ALFRED HAMILTON McKEAG.